(12) United States Patent
George et al.

(10) Patent No.: US 7,822,515 B2
(45) Date of Patent: Oct. 26, 2010

(54) OCEAN BOTTOM SEISMIC SENSOR CABLE SYSTEM INCLUDING TORQUE-RELIEVING SWIVEL

(75) Inventors: Nicholas C. George, Sugar Land, TX (US); Ole-Fredrik Semb, Borgheim (NO)

(73) Assignee: PGS Americas, Inc., Houston, TX (US)

( * ) Notice: Subject to any disclaimer, the term of this patent is extended or adjusted under 35 U.S.C. 154(b) by 606 days.

(21) Appl. No.: 11/881,887

(22) Filed: Jul. 30, 2007

(65) Prior Publication Data

US 2008/0056066 A1 Mar. 6, 2008

Related U.S. Application Data

(63) Continuation-in-part of application No. 11/082,264, filed on Mar. 17, 2005, now abandoned.

(51) Int. Cl.
 *G01K 11/00* (2006.01)
(52) U.S. Cl. .................. 701/20; 701/153; 174/101.5
(58) Field of Classification Search .............. 367/15, 367/16, 20, 153, 154; 174/101.5
 See application file for complete search history.

(56) References Cited

U.S. PATENT DOCUMENTS

| | | | |
|---|---|---|---|
| 4,450,543 A | 5/1984 | Neeley | |
| 4,756,268 A * | 7/1988 | Gjestrum et al. | 114/242 |
| 5,417,592 A | 5/1995 | West | |
| 5,673,644 A * | 10/1997 | Vanasse et al. | 114/242 |
| 5,983,821 A | 11/1999 | Williams | |
| 6,775,203 B2 | 8/2004 | Fagerås et al. | |
| 2005/0249040 A1 | 11/2005 | Luc et al. | |
| 2005/0270901 A1 | 12/2005 | Swanson | |

FOREIGN PATENT DOCUMENTS

GB 2 339 753 2/2000

\* cited by examiner

*Primary Examiner*—Mark Hellner
(74) *Attorney, Agent, or Firm*—E. Eugene Thigpen; Richard A. Fagin

(57) ABSTRACT

An ocean bottom cable system includes a sensor cable configured to be extended from a vessel to the bottom of the body of water. The sensor cable includes a plurality of seismic sensor units at spaced apart locations. A lead in cable is coupled at a to at least one of the vessel and a buoy, and to an aft lead in cable segment. The segment includes a cable loop to compensate water-caused motion of the lead in cable substantially without moving the sensor units. A first swivel is disposed between a forward end of the sensor cable and an aft end of the aft lead in cable segment. The first swivel enables relative rotation between the sensor cable and the segment. At least a second swivel is disposed between the second end of the lead in cable and a forward end of the aft lead in segment.

13 Claims, 8 Drawing Sheets

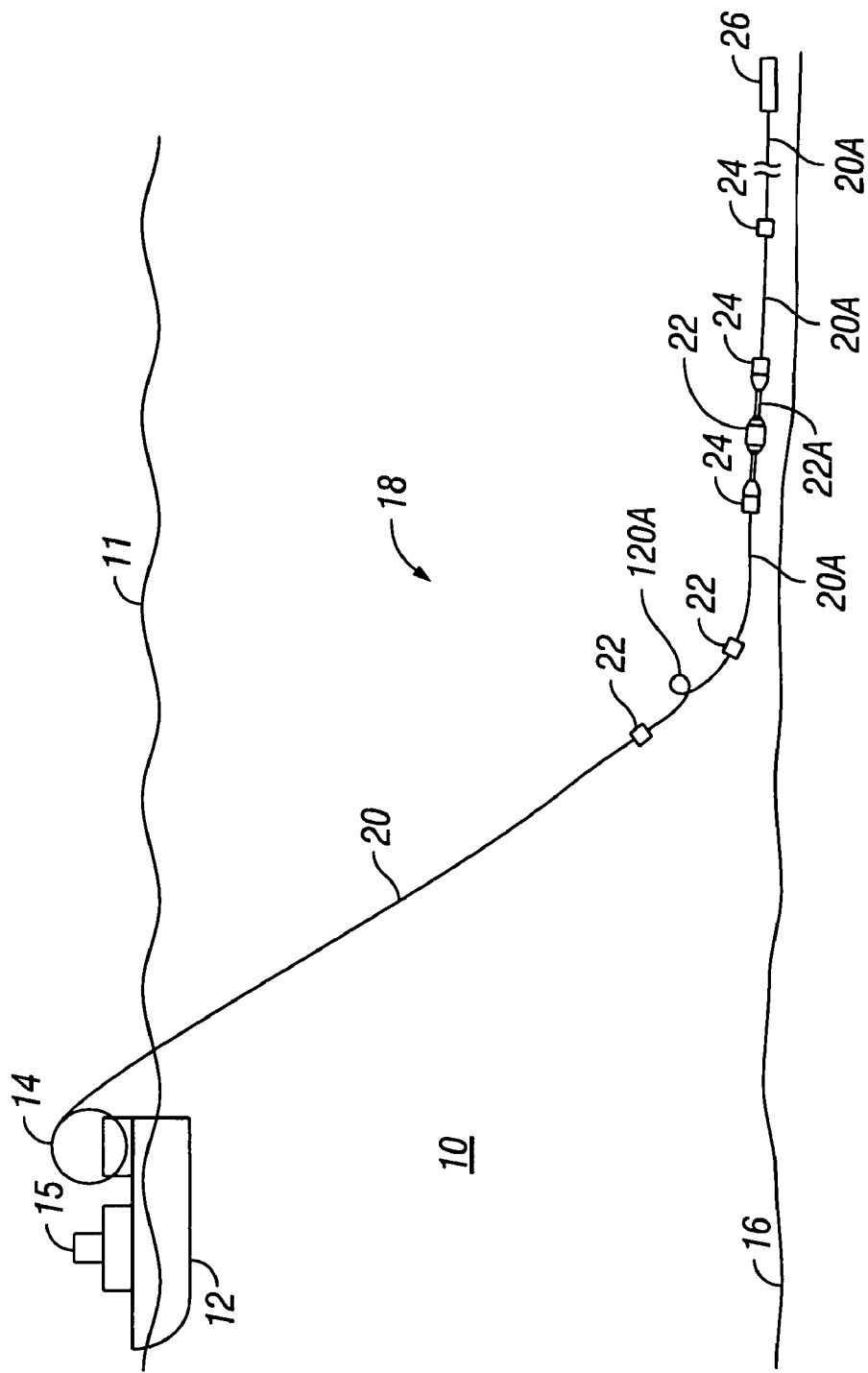

OCEAN BOTTOM SEISMIC SENSOR CABLE SYSTEM INCLUDING TORQUE-RELIEVING SWIVEL

CROSS-REFERENCE TO RELATED APPLICATIONS

This application is a continuation-in-part of U.S. patent application Ser. No. 11/082,264 filed on Mar. 17, 2005 now abandoned, which is herewith.

STATEMENT REGARDING FEDERALLY SPONSORED RESEARCH OR DEVELOPMENT

Not applicable.

BACKGROUND OF THE INVENTION

1. Field of the Invention

The invention relates generally to the field of ocean bottom cable (OBC) seismic survey sensor systems. More specifically, the invention is related to devices for improving the efficiency of deployment and retrieval of OBCs, and for reducing the incidence of damage to OBCs during deployment and retrieval and during periods of operation in high sea states.

2. Background Art

Seismic surveying performed in bodies of water (marine seismic surveying), such as lakes or the ocean, includes ocean bottom cable (OBC) surveying techniques. OBCs are deployed on the water bottom and include seismic sensors arranged such that various techniques may be applied to the sensor measurements to attenuate undesirable artifacts common to marine seismic data known generally as "ghosts" and "water layer multiples."

An OBC includes a length of reinforced electrical and/or optical cable having sensors, or sensor "units" coupled with or disposed along the cable at spaced apart locations. The sensor units typically include one or more particle motion sensors, such as geophones or accelerometers, and at least one sensor responsive to pressure (or a sensor responsive to rate of change of pressure). Electrical conductors and/or optical fibers in the cable conduct signals from the various sensors to a recording device typically coupled to one end of the cable.

OBCs are typically deployed by unspooling them from a winch drum or reel located on a deployment vessel (called a "cable handling vessel"), allowing the cable with a suspended weight to reach the bottom of the body of water. The cable handling vessel moves in a direction along which it is intended to position the OBC along the water bottom for a seismic survey and slowly deploys the cable to maintain a predetermined critical tension. When the OBC is laid to an extent such that the nearest sensor unit (that sensor unit closest to the cable handling vessel) reaches the water bottom under the proper tension, the cable handling vessel is typically stopped. The un-spooling continues until a sufficient additional length of lead in cable is laid on the bottom so as to compensate for buoy/vessel drift, high seas or the collection of multiple OBC lead-ins by a single recording vessel. This continued un-spooling will typically create loops in the lead in cable After unspooling is completed, a buoy or similar device may be attached to the water surface end of the OBC, such that a recording system may be coupled to the OBC for subsequent seismic data acquisition and recording. The recording system may, alternatively, be located on the recording vessel such that buoy connection is not required.

It will be appreciated by those skilled in the art that a "lead in" is a section of cable or cables, depending on water depth, having no sensors and connecting the sensor array (OBC) to either a cable handling vessel, a recording vessel or a buoy. After unspooling is completed, the lead-in is under only the tension resulting from the lead in cable weight in the water column, with the loops in the lead in cable allowing for the OBC sensor cable to remain in place and unaffected by sea states or other high tension transient loads that would otherwise cause the cable to move off the specified cable position on the water bottom or to torque and create through a loop in itself.

OBCs made for relatively shallow water may include a centrally disposed electrical conductor surrounded by a layer of insulation. The insulation may then be surrounded by an electrically conductive metal braid, which in combination with the central conductor serves as a coaxial cable. The exterior of the OBC is typically surrounded by a plastic jacket to exclude water and to provide electrical insulation. In such shallow water OBCs, there may be one or more reinforcement layers to provide axial strength to the OBC. Typically, in such OBCs the reinforcement layer is in the form of a woven fiber braid. Such shallow water OBCs, having only braided reinforcement devices, are substantially free of induced torque when tension on the cable is increased and decreased. Deployment of such OBCs is not typically associated with any difficulties relating to torque along the cable caused by tension. However, there is a tendency of such shallower depth OBCs to assume the shape of the winch or reel while on the winch and under tension. As tension is relieved during deployment, the OBC may form loops where the OBC tries to return to its shape under tension. Such loops will not be relieved or unwound as the OBC is retrieved from the water bottom. In such cases, the loops may cause the OBC to kink when tension is reapplied. Kinking may damage the cable, thus necessitating expensive repair or replacement of the cable and shutting down the operation.

As OBCs are made to be used in deeper bodies of water, it has proven necessary to use cable structures that have various forms of wound wire armor, in order that the cable will have sufficient axial strength to support its own weight when suspended in the body of water. For example, in a typical OBC used for water depths of 3,000 meters or less, the cable may include three, concentrically placed, helically wound layers of armor wires surrounding the center conductor and shield layer. When helically wound armor wires are subjected to axial stress, they impart a torque to the cable as they tend to unwind. While typical armored electrical cables include a plurality of contrahelically-wound layers of armor wires (meaning that successive layers are wound with opposing helical lay direction), it is impracticable to create a completely torque balanced, wound wire armored cable. Torque balanced in this context means that there is substantially no torque along the cable within a specific range of cable loads. In the foregoing example of a deeper water OBC, as the lead in is deployed, substantially all of the axial stress is relieved at the water bottom position of the lead in. Such stress relief generates substantial torque imbalance along the cable at the water bottom and at the water column interface. Due to operational conditions an additional amount of lead-in cable must be 'dropped in-loops' on the water bottom to allow for extension from the buoy's interaction with the sea surface during rough sea states, or with 'rolling' of the cable to connect with the recording vessel as described below. As the cable is pulled and relaxed by motion of the buoy or vessel at the surface, the loops are pulled off the water bottom and are pulled into tight loops or kinks. The loops can cause the cable to kink when the cable is retrieved from the water bottom.

In multiple-cable OBC surveys, a plurality of OBCs are typically deployed on the water bottom substantially parallel to each other along a selected direction. Each OBC in the multiple-cable survey includes a lead in made substantially as described above for a single cable OBC survey. In a multiple cable OBC survey, however, the lead in is typically terminated at a common location at the water surface. During a multiple cable survey, a recording vessel is connected to the water surface ends of all the OBCs. During the survey, a laterally endmost one of the OBCs is disconnected from the surface location, and the recording vessel is moved laterally while still connected to several of the remaining OBCs. The disconnected OBC is retrieved by the deployment vessel and may be moved to a location along the opposed lateral end of the "spread" of OBCs on the water bottom. Lateral movement of the recording vessel imparts lateral tension along the connected OBCs and causes the cable to 'roll' along the water bottom Such lateral movement is another source of torque which may result in kinks in the OBCs. Just as in the case of the single OBC survey operation, when an OBC having loops therein is retrieved, the rapid application of axial stress may result in kinks in the cable as the torque along the loop cannot be quickly relieved.

It is desirable to have a system for OBC surveying which reduces the possibility of looping and consequent kinking in the cable.

SUMMARY OF THE INVENTION

An ocean bottom cable system according to one aspect of the invention includes a sensor cable configured to be extendible from a vessel at the surface of a body of water to the bottom of the body of water. The sensor cable includes at least one of an electrical conductor and an optical fiber therein. The sensor cable includes a plurality of seismic sensor units at spaced apart locations. At least one lead in cable is coupled at a first end to at least one of the vessel and a buoy, and at a second end to a forward end of an aft lead in cable segment. The aft lead in cable segment includes a cable loop having sufficient length to compensate water-caused motion of the lead in cable substantially without moving any of the sensor units when disposed on the bottom of the body of water A first swivel is disposed between a forward end of the sensor cable and an aft end of the aft lead in cable segment. The first swivel is configured to enable relative rotation between ends of the sensor cable and the aft lead in cable segment coupled thereto. The first swivel is further configured to transmit axial force along the cable therethrough. The system includes at least a second swivel disposed between the second end of the lead in cable and a forward end of the aft lead in segment. The second swivel is configured to transmit axial force along the cable therethrough.

Other aspects and advantages of the invention will be apparent from the following description and the appended claims.

BRIEF DESCRIPTION OF DRAWINGS

FIG. 1 shows a typically cable handling vessel deploying an ocean bottom cable (OBC) and system according to one embodiment of the invention.

DETAILED DESCRIPTION

Figure 1A:
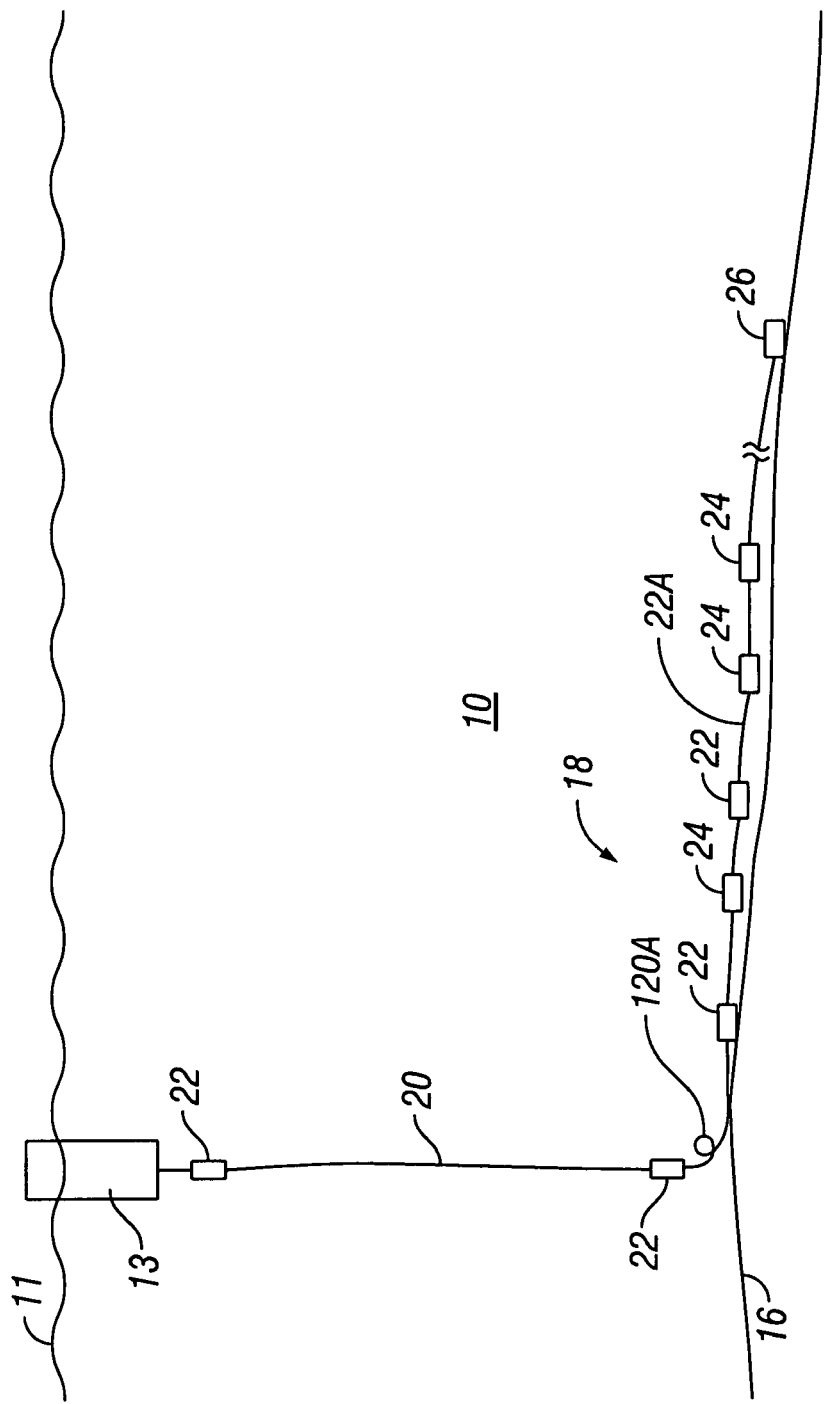
FIG. 1A shows the ocean bottom cable of FIG. 1 fully deployed in the water and suspended at one end by a recording buoy.

One example of an ocean bottom cable (OBC) system is shown in FIG. 1 being deployed in a body of water 10. A cable handling vessel 12, which may in some examples include seismic data recording equipment 15 of any type known in the art, moves in a selected direction along the surface 11 of the water 10. A winch, reel or similar spooling device, shown generally at 14, is disposed on the cable handling vessel 12 such that an OBC system 18 can be deployed from the cable handling vessel 12, typically from its aft end under a predetermined tension. The winch 14 can be any type known in the art for deployment of marine seismic sensor cables. The winch 14 has the OBC system 18 spooled thereon. The winch 14 extends the OBC system 18 into the water 10 as the cable handling vessel 12 moves along the selected direction. The rate of unspooling and the speed of the cable handling vessel 12 are selected such that a sensor cable portion of the OBC system 18 eventually rests on the water bottom 16 in a substantially straight line along the direction of motion of the cable handling vessel 12.

For purposes of explaining the invention, the OBC system 18 may be described as consisting of a lead in cable 20 and a sensor cable. The sensor cable portion of the OBC system 18 in the present example may be assembled from a plurality of selected length cable segments 20A, each of which may be formed from armored coaxial cable, as will be further explained with reference to FIG. 6. Each end of each of the cable segments 20A can be terminated in an electrical connector (explained below with reference to FIG. 2) which can couple to either an axial end of a swivel 22 or to an axial end of a sensor unit 24. The sensor cable can include at its distal or aft (from the vessel 12) end a weight 26 to urge the sensor cable to lay straight 16 during deployment. The end of the OBC system 18 proximate the vessel 12 (and on the winch 14) includes the lead in cable 20, which may be terminated at the end proximate the sensor cable with a connector (as will be explained further below with reference to FIG. 2) coupled to a swivel 22. As will be appreciated by those skilled in the art, the lead in cable 20 may be a single segment of cable or may be assembled from a plurality of selected length cable segments coupled end to end using any type of cable connector known in the art.

As the vessel 12 moves, and the OBC system 18 is extended from the winch 14, the sensor cable section of the OBC system 18 comes to rest on the water bottom 16.

After the last swivel 22 at the forward end of the sensor cable is deployed so as to be proximate or on the water bottom 16, the vessel 12 stops moving. The winch 14 continues to extend the OBC system 18 so that the lead in cable 20 is substantially vertical from the water bottom 16 to the vessel 12. In some embodiments, the vessel end of the lead in cable 20 can be coupled to a buoy (see FIG. 1A) or other flotation device such that a recording vessel (which may also be the deployment vessel 12) may electrically couple to the lead in cable 20 at the water surface for power and data communication to the various sensor units 24 along the OBC system 18. The particular type of surface termination and connection of the OBC used in any embodiment is not intended to limit the scope of the invention. After coupling to the buoy, the lead in cable 20 may be released from the vessel 12.

The near-vessel (forward) end of the sensor cable may include an end lead in cable segment 120A ("aft lead in segment") that is terminated at both ends by a connector coupled to a swivel 22. The manner in which the aft lead in segment 120A is deployed will be explained below with reference to FIG. 1A. Typically the aft lead in segment 120A is similar in configuration to the lead in cable 20, in that there are no sensors disposed in the aft lead in segment 120A.

The example shown in FIG. 1 includes only one OBC system 18, primarily for clarity of illustrating the principle of the invention. It is to be clearly understood, however, that the arrangement of the OBC system 18 in FIG. 1 is only an example of OBC systems within the scope of the present invention, and that the number of OBC systems used in any implementation is not a limit on the scope of the invention. Moreover, the arrangement of sensor units 24 and swivels 22 in FIG. 1 is only an example of such arrangements, and is not intended to limit the scope of the invention.

FIG. 1A shows the OBC system 18 with the sensor cable portion (assembled cable segments 20A) fully deployed on the water bottom 16. After the lead in cable 20 is fully extended from the vessel 12, the vessel end of the lead in cable 20 may be coupled to and suspended in the water 10 from a buoy 13, as explained above. The buoy 13 may in some examples include data recording devices (not shown) therein for recording signals transmitted from the various sensor units 24. In some examples, a swivel 22 may be coupled between the lead in cable 20 and the buoy 13. The aft (bottom) end of the lead in cable 20 is coupled to one axial end of one of the swivels 22. The aft lead in segment 120A is typically coupled to the other end of the same swivel 22 as is coupled to the bottom end of the lead in cable 20. The aft lead in segment 120A is deployed such that it forms a coil or loop as shown in FIG. 1A. The coil or loop provides extra cable length between the bottom or aft end of the lead in cable 20 and the forward end of the sensor cable section such that as the height of the water 10 (the column between the water bottom 16 and the water surface 11) changes due to ordinary action of waves and tides, the sensor cable section aft of the aft lead in segment 120A, which is shown beginning at a first one of the sensor units 24, will not be lifted from the water bottom 16. When deployed as shown in FIG. 1A, therefore, the sensor cable portion of the OBC system 18 will not be moved from its rest position along the water bottom 16 as the buoy 13 rises and falls with movement of the water surface 11.

In deployment of OBCs known in the art prior to the present invention, where a swivel is used only between the lead in and the buoy, the coil or loop formed in the equivalent of the aft lead in segment is susceptible to kinking under a number of circumstances, including during movement of the OBC to another position on the water bottom, during retrieval of the OBC from the water bottom or even ordinary motion of the lead in cable when coupled to a buoy. It has been determined that by providing a swivel at least between the forward end of the aft lead in segment 120A and the aft (water bottom) end of the lead in cable 20, such a loop or coil may be unwound during movement of the OBC system 18 without kinking the aft lead in segment 120A.

Figure 2:
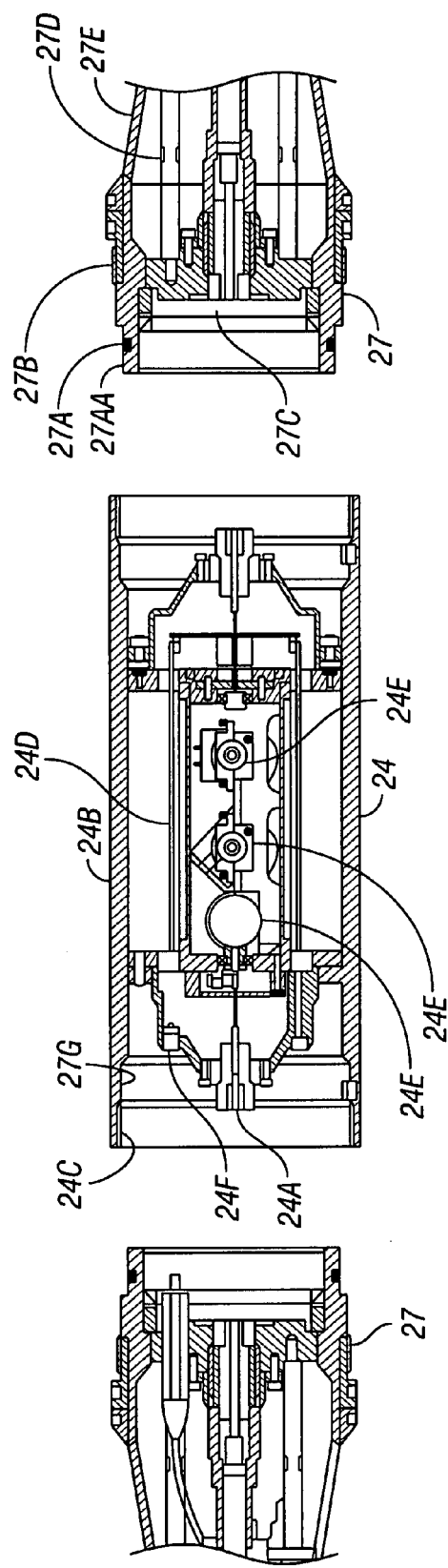
FIG. 2 shows a cross sectional view of a sensor section of the OBC system of FIG. 1.

FIG. 2 shows a cross section of a typical sensor unit 24 and electrical connectors 27 used to terminate the ends of the cable segments (20A in FIG. 1). Each connector 27 includes a pressure resistant housing 27E adapted to exclude fluid under pressure from entering an interior space thereof, and adapted to transfer axial stress or tension from the cable segment (20A in FIG. 1) to the housing 27E, and then transfer the axial stress or tension to a mating housing 24B of the sensor unit 24 to which the connector 27 is coupled. The interior of the connector housing 27E includes a centrally disposed electrical contact 27C coupled to a central electrical conductor (see FIG. 6) in the cable segment (20A in FIG. 1). The central contact 27C couples to a corresponding contact 24A in the sensor unit 24. A laterally displaced, outer electrical contact 27D electrically connects a shield (see FIG. 6) in the cable segment 20A in FIG. 1) to a corresponding outer contact 24F in the sensor unit 24. The electrical conductor arrangement in the cable segment and connector 27 are only one example of connections that may be made between cable segments and a sensor unit. Other embodiments may include three or more electrical conductors in cable segments and a corresponding number of electrical contacts in the connector 27. Still other embodiments may include one or more optical fibers in addition to or in substitution of the electrical conductors in the cable, and appropriate optical couplings may be included in such embodiments of the connector 27. Accordingly, the electrical and/or optical configuration of the connector 27 is not intended to limit the scope of the invention.

The connector 27 includes an external sealing surface 27AA for engagement to a corresponding, sealing interior surface 27G of the sensor unit housing 24B. Sealed to exclude fluid entry can be effected by an o-ring 27A or similar sealing element. A threaded coupling 27B on the connector 27 engages a corresponding coupling 27C on the interior surface of the sensor unit housing 24B to effect the coupling of the connector 27 and the housing 24B, and to effect transfer of axial stress therebetween.

When a connector 27, configured as shown in FIG. 2, is engaged to each axial end of the sensor unit housing 24B, electrical contact is made between circuits 24D disposed inside the sensor unit housing 24 and the electrical conductors (see FIG. 6) in the cable segment (20A in FIG. 1), and axial stress is transmitted from the cable segment (20A in FIG. 1) through the sensor unit housing 24B. As importantly, fluid is excluded from entering the sensor unit housing 24B by the sealing engagement of the connectors 27 to the sensor unit housing 24B.

The circuits 24D disposed in the sensor unit housing 24B can include conventional seismic sensors such as can measured a parameter related to particle motion (shown as geophones 24E) coupled to suitable signal amplification, processing, and telemetering circuitry (shown collectively, but not individually at 24D) for communicating signals from the sensors 24E to the recording system (such as shown generally at 15 in FIG. 1). The sensors 24E may also include one or more hydrophones (not shown separately) or other sensor responsive to pressure and/or rate of change in pressure. Although the present example includes geophones, as is known in the art, any other type of sensor responsive to motion, such as accelerometers, may be used in other implementations of a sensor unit.

It should also be understood that the embodiment of sensor unit as shown in FIG. 2, which is intended to be coupled between cable segments, is only one implementation of a system according to the invention. The implementation as shown in FIG. 2 is particularly suited to OBCs used in deeper water depths, e.g., up to about 3,000 meters depth. Implementation intended for shallower depth water may include sensor units coupled to the exterior of the cable segments, and may omit the connectors as shown in FIG. 2 for coupling to such cable segments end to end.

In the present example, the cable segments (20A in FIG. 1) can be about 25 meters length, thus the sensor units 24 are typically separated from adjacent sensor units by about 25 meters. The actual separation between sensors and sensor units is not a limit on the scope of this invention.

Figure 3:
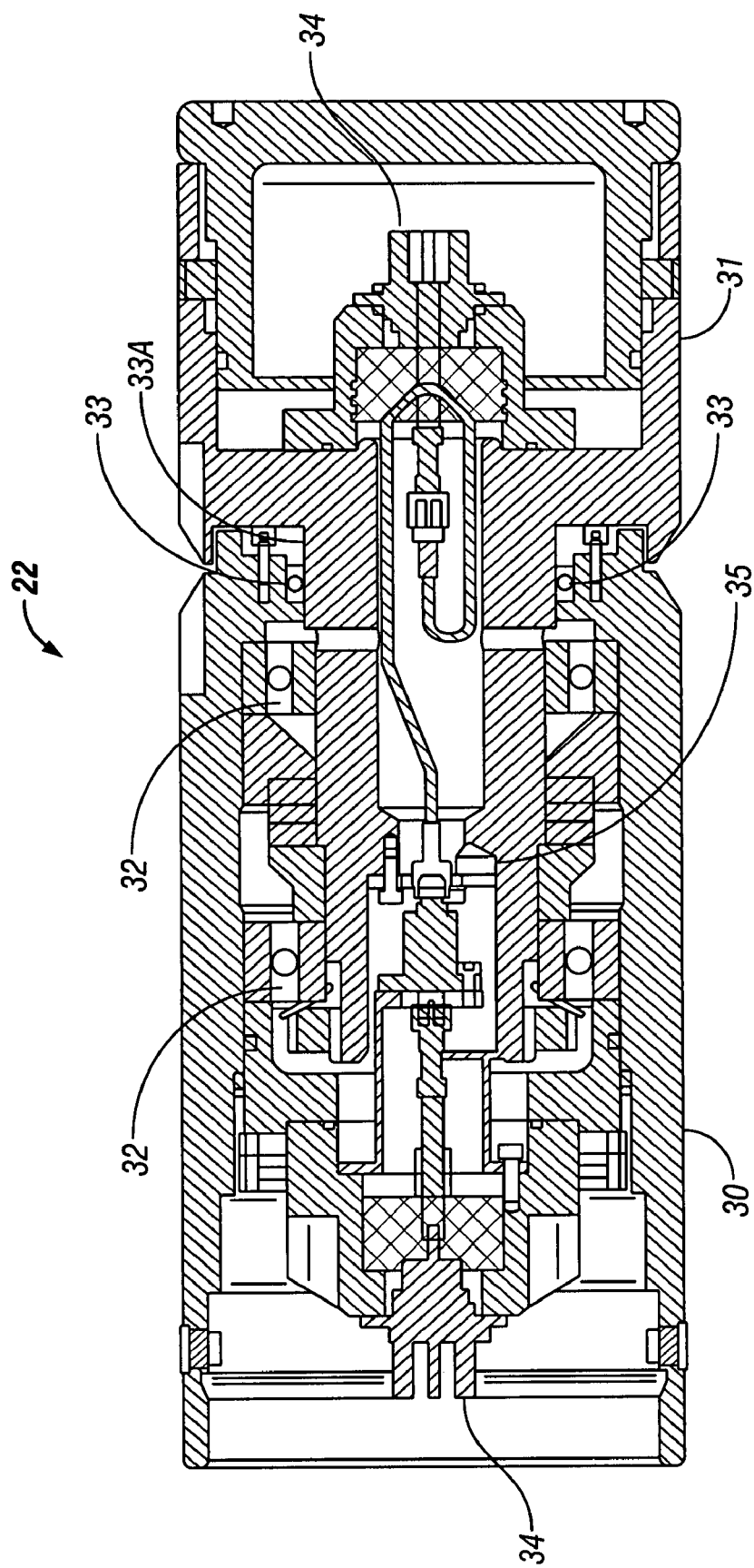
FIG. 3 shows a cross-sectional view of a swivel of the OBC system of FIG. 1.

FIG. 3 shows a cross sectional view of one of the swivels 22. The swivel 22 includes a first connector housing 30 sealingly, rotatably engaged to a second connector housing 31. Sealing engagement in the present embodiment can be effected by o-rings 33 or similar sealing devices disposed on a seal extension 33A forming part of the second connector housing 31. The seal extension 33A fits inside a corresponding receptacle in the first connector housing 30. Each of the connector housings 30, 31 has disposed centrally therein an electrical connector 34 adapted to mate electrically and mechanically with the contact (27C in FIG. 2) in one of the cable segment connectors (27 in FIG. 2). The seal extension 33A is rotatably supported inside receptacle in the first housing 30 by bearings 32. Rotatable electrical contact can be obtained by a slip ring 35 or similar device. Interior surfaces of the axial outer ends of the housings 30, 31 are adapted to threadedly receive the threaded couplings (27B in FIG. 2) on any of the connectors (27 in FIG. 2). In combination, the first housing 30, second housing 31, and connectors 27 define a device which maintains electrical continuity between two cable segments (20 in FIG. 1) coupled to each end of the swivel 22, maintains electrical insulation between conductors (see FIG. 1) in the cable segments (20A in FIG. 1) and enables relative rotation between the cable segments coupled to each end of the swivel 22.

Practical implementations of a swivel may include that the interior chamber is filled with dielectric liquid (not shown), such as oil. In some embodiments of a swivel, the dielectric liquid may be exposed to external hydrostatic pressure such as by means of a pressure compensating device (not shown), such as a piston or bladder of any type well known in the art for such pressure compensation.

While the swivel 22 shown in FIG. 3 includes only one electrical conductor in the slip ring 35, multiple conductor slip rings are known in the art and may be used in other embodiments of an OBC system in which there is more than one insulated electrical conductor forming part of the cable thereof. It is also know in the art to provide optical slip rings, to obtain a continuous, rotatable optical connection between two optical fibers. Other implementations of the swivel 22 may include one or more optical slip ring channels. As used in the context of this invention, therefore, the term "swivel" is intended to mean any device that maintains an electrical and/or optical contact between two members, while enabling relative rotation between the two members.

Figure 5:
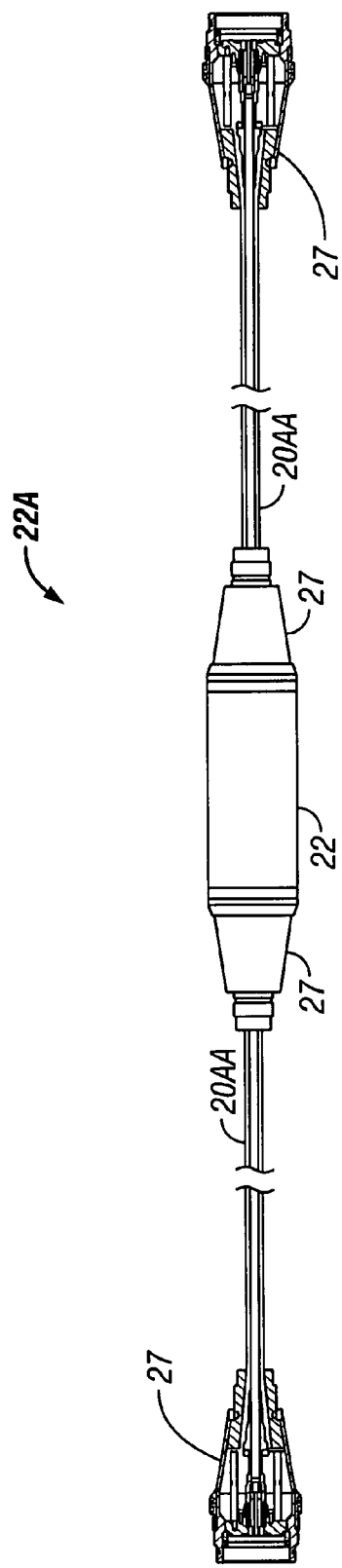
FIG. 5 shows a segment of OBC including a swivel as shown in FIG. 3.

In some examples of an OBC system according to the invention, one or more of the cable segments, such as shown at 20A in FIG. 1, may be substituted by a swivel cable section such as shown in FIG. 5. A swivel cable section may include two, 12.5 meter long cable segments 20AA, each end of which is terminated with a connector 27, such as explained above with reference to FIG. 2. One connector 27 from each cable segment 20AA is coupled to a swivel 22, such as explained above with reference to FIG. 3.

Figure 4:
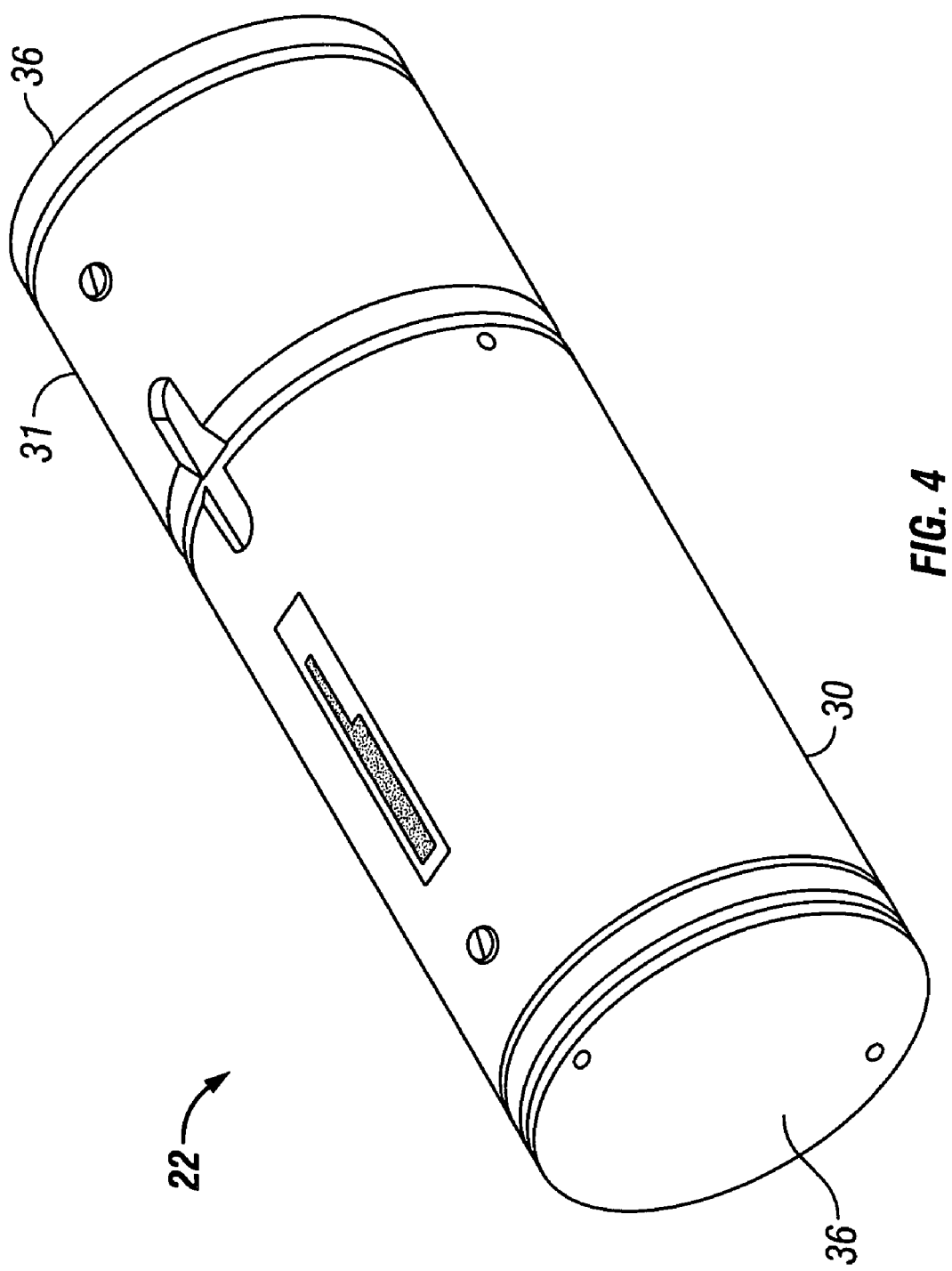
FIG. 4 shows an oblique view of the swivel shown in FIG. 3.

An oblique view of the swivel 22 having protective caps 36 on each end for shipment is shown in FIG. 4. Preferably the exterior shape of the first housing 30 and second housing 31 is cylindrical to reduce the chance of rotational sticking during use of the swivel.

Figure 6:
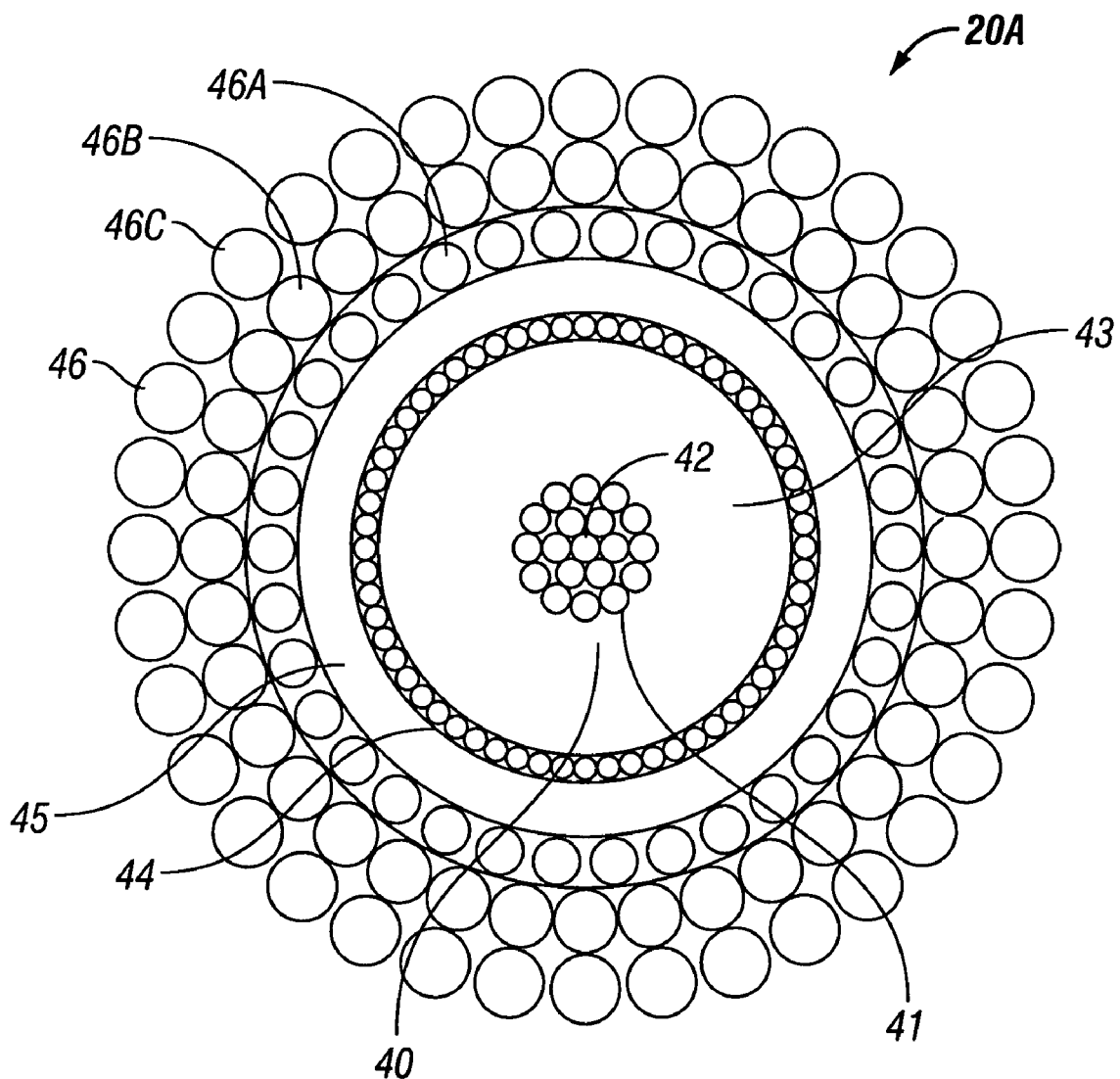
FIG. 6 shows an end view of cable that may be used with a system as shown in FIG. 1.

A typical armored electrical cable that may be used in various embodiments of a system according to the invention, such as for the lead in cable (20 in FIG. 1) or for the cable segments (20A in FIG. 1) or swivel cable segments (20AA in FIG. 5) is shown in end view in FIG. 6. The cable may include a central conductor core 40 consisting of a nylon monofilament strength member 42 surrounded by copper strands 42. The strands 41 may be helically wound around the strength member 42. The conductor core 40 may be surrounded by an insulator layer 43, such as high density polyethylene (HDPE). The insulation layer 43 may be surrounded by a shield conductor layer 44, which may include copper strands and supporting tape. An insulator 45 may surround the shield layer 44. The cable is armor reinforced, in the present embodiment, by three, contrahelically wound layers 46A, 46B, 46C of steel wires (which may be galvanized) to form armor 46. While the foregoing embodiment of a cable includes only a single, centrally located electrical conductor (core 40), other embodiments may include a plurality of such electrical conductors surrounded by steel wire armor. See, for example, part no. A305338, Rochester Corporation, Culpeper, Va. 22701, which includes seven insulated electrical conductors in its core.

Figure 7:
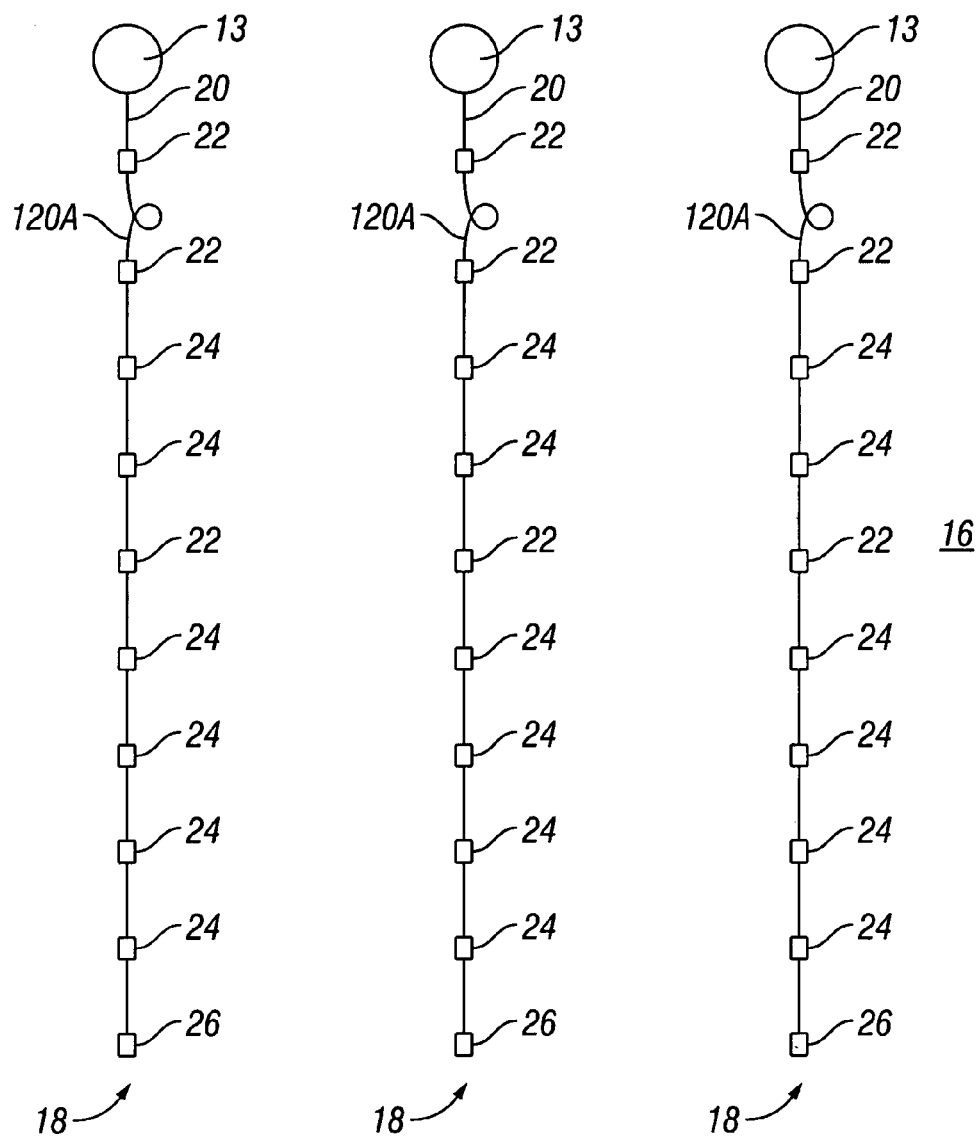
FIG. 7 shows an OBC system including a plurality of OBCs arranged in a selected pattern on the water bottom.

FIG. 7 shows a plan view of an OBC survey configuration including three OBC systems 18 deployed in a selected pattern on the water bottom. Each OBC system 18 is suspended from a respective buoy 13. Each buoy 13 is coupled to a respective lead in cable 20. As explained with reference to FIG. 1A, the aft end of each lead in cable 20 is coupled to one end of a swivel 22, which in turn is coupled to one end of a aft lead in segment 120A. Each such aft lead in segment 120A may be deployed in a loop or coil as shown to provide extra cable such the sensor cable of each OBC system 18 does not move as the respective buoys 13 rise and fall with the water height. After a seismic survey is conducted using the system as shown in FIG. 7, the OBC system 18 may be moved to different locations on the water bottom 16 by coupling the forward end of each lead in cable 20 to the winch (14 in FIG. 4) and spooling the OBC system 18 onto the winch. Because the loop or coil formed in each aft lead in segment 120A includes a swivel 22 at least between the forward end thereof and the lead in cable 20, as each aft lead in segment 120A is lifted from the water bottom, the loop or coil may readily unwind without kinking as any torque generated by the tension required to 'un-stick' the cable from the ocean bottom is relieved between the sticking point and the bottom end of the lead in cable 20 through the swivel 22. To the extent any torque is exerted on any part of the sensor cable because of the construction of the armor wires in each cable segment (see FIG. 6), such torque may be relieved by including at least one swivel 22, and preferably a plurality of longitudinally distributed swivels 22, within the sensor cable portion of the OBC system 18.

OBC systems according to the present invention may be deployed, moved and retrieved while substantially eliminating any kinking within the cable. By reducing or eliminating kinking in the OBCs, such systems may have reduced maintenance and repair costs, and may provide greater efficiency in operation by reducing cable failure caused by kinking.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An ocean bottom cable system, comprising:

a sensor cable configured to be extendible from a vessel at the surface of a body of water to the bottom of the body of water, the sensor cable including at least one of an electrical conductor and an optical fiber therein, the sensor cable including a plurality of seismic sensor units at spaced apart locations;

at least one lead in cable coupled at a first end to at least one of the vessel and a buoy and at a second end to a forward end of an aft lead in cable segment, the aft lead in cable segment including a cable loop having sufficient length to compensate water-caused motion of the lead in cable substantially without moving any of the sensor units when disposed on the bottom of the body of water;

a first swivel disposed between a forward end of the sensor cable and an aft end of the aft lead in cable segment, the first swivel configured to enable relative rotation between ends of the sensor cable and the aft lead in cable segment coupled thereto, the first swivel configured to transmit axial force along the cable therethrough; and at least a second swivel disposed between the second end of the lead in cable and a forward end of the aft lead in segment, the second swivel configured to transmit axial force along the cable therethrough.

2. The system of claim 1 wherein the sensor units each include at least one particle motion sensor and a sensor responsive to pressure in the body of water.

3. The system of claim 1 wherein the sensor cable is divided into segments each having a selected length, the segments terminated at each end thereof with a connector, each connector adapted to provide at least one of electrical contact and optical contact between an end of the cable segment and a device coupled to the end of the cable segment.

4. The system of claim 1 wherein each sensor unit is adapted to couple to one of the connectors at each end thereof.

5. The system of claim 1 wherein the sensor cable comprises a coaxial cable disposed within a plurality of concentric, contrahelically wound layers of armor wires.

6. The system of claim 1 wherein first and second swivels are configured to maintain at least one of electrical contact and optical contact therethrough while enabling the relative rotation.

7. The system of claim 1 further comprising a plurality of swivels disposed at spaced apart locations along the sensor cable.

8. An ocean bottom cable seismic sensor system, comprising:

a plurality of sensor cables each configured to be extendible from a vessel at the surface of a body of water to the bottom of the body of water, each sensor cable including at least one of an electrical conductor and an optical fiber therein, the sensor cable including a plurality of seismic sensor units at spaced apart locations;

a plurality of lead in cables each coupled at a first end to a respective buoy and each at a second end thereof to a forward end of a corresponding aft lead in cable segment, each corresponding aft lead in cable segment including a cable loop having sufficient length to compensate water-caused motion of the corresponding lead in cable substantially without moving any of the sensor units in each sensor cable when disposed on the bottom of the body of water;

a first swivel disposed between a forward end of each sensor cable and an aft end of each corresponding aft lead in cable segment, each first swivel configured to enable relative rotation between ends of the respective sensor cable and aft lead in cable segment coupled thereto, each first swivel configured to transmit axial force along the cable therethrough; and at least a second swivel disposed between the second and of each lead in cable and the forward end of each aft lead in cable segment, each second swivel configured to transmit axial force along the cable therethrough.

9. The system of claim 8 wherein the sensor units each include at least one particle motion sensor and a sensor responsive to pressure in the body of water.

10. The system of claim 8 wherein each sensor cable is divided into segments each having a selected length, the segments terminated at each end thereof with a connector, each connector adapted to provide at least one of electrical contact and optical contact between an end of the cable segment and a device coupled to the end of the cable segment.

11. The system of claim 10 wherein the cable segments each comprise at least one of an electrical conductor and optical fiber and a plurality of layers of contrahelically wound armor wires surrounding the at least one of the electrical conductor and the optical fiber.

12. The system of claim 8 wherein each swivel is adapted to maintain at least one of electrical contact and optical contact therethrough while enabling the relative rotation.

13. The system of claim 8 further comprising a plurality of swivels disposed at spaced apart locations along each sensor cable.

* * * * *